(12) United States Patent
Teeuwen

(10) Patent No.: US 8,460,730 B2
(45) Date of Patent: Jun. 11, 2013

(54) METHOD FOR MANUFACTURING WRAPPED FOOD PRODUCTS, AS WELL AS CONVEYOR SYSTEM FOR CARRYING OUT SAID METHOD

(75) Inventor: Gerardus Leonardus Mathieu Teeuwen, Roermond (NL)

(73) Assignee: Teeuwen Patisserie, Roermond (NL)

( * ) Notice: Subject to any disclaimer, the term of this patent is extended or adjusted under 35 U.S.C. 154(b) by 271 days.

(21) Appl. No.: 12/572,741

(22) Filed: Oct. 2, 2009

(65) Prior Publication Data

US 2010/0092633 A1    Apr. 15, 2010

(30) Foreign Application Priority Data

Oct. 2, 2008 (EP) ..................................... 08165688

(51) Int. Cl.
*A21D 13/00* (2006.01)
*A23G 3/02* (2006.01)
*A47J 21/00* (2006.01)
*B21B 39/00* (2006.01)
*B65G 17/00* (2006.01)

(52) U.S. Cl.
USPC ................. 426/389; 198/339.1; 198/341.09; 426/512; 426/515; 99/643

(58) Field of Classification Search
USPC ... 426/36, 51, 389, 438, 496, 512; 198/339.1, 198/370; 99/353, 450–454
See application file for complete search history.

(56) References Cited

U.S. PATENT DOCUMENTS

| | | | |
|---|---|---|---|
| 2,700,939 A * | 2/1955 | Liston | 53/122 |
| 3,025,983 A * | 3/1962 | Fasano | 414/414 |
| 3,580,188 A | 5/1971 | Lutsey | |
| 3,962,470 A | 6/1976 | Stucker | |
| 4,750,415 A * | 6/1988 | Ostemar | 99/458 |
| 2002/0022073 A1 | 2/2002 | Soehnlen et al. | |
| 2004/0081934 A1 * | 4/2004 | Haas et al. | 432/121 |

FOREIGN PATENT DOCUMENTS

| | | |
|---|---|---|
| GB | 920 686 | 3/1963 |
| WO | 93/00824 | 1/1993 |
| WO | WO 9300824 A1 * | 1/1993 |

OTHER PUBLICATIONS

European Search Report dated Mar. 3, 2009, from corresponding European application.

* cited by examiner

*Primary Examiner* — Humera Sheikh
*Assistant Examiner* — Subbalakshmi Prakash
(74) *Attorney, Agent, or Firm* — Young & Thompson

(57) ABSTRACT

A method for manufacturing food products, such as mousse products, includes the steps of:
  providing a transport conveyor having a transport surface,
  providing a molding conveyor having molding apertures therein, the molding apertures being positioned above the transport surface,
  making the transport surface of the transport conveyor and the molding apertures of the molding conveyor move in unison from an input end towards an output end,
  positioning a mold within a molding aperture of the molding conveyor and on top of the transport surface of the transport conveyor near the input end,
  applying a food substance within the mold,
  removing the products including the mold and the food substance from the molding apertures near the output end.

6 Claims, 3 Drawing Sheets

Figure 1:
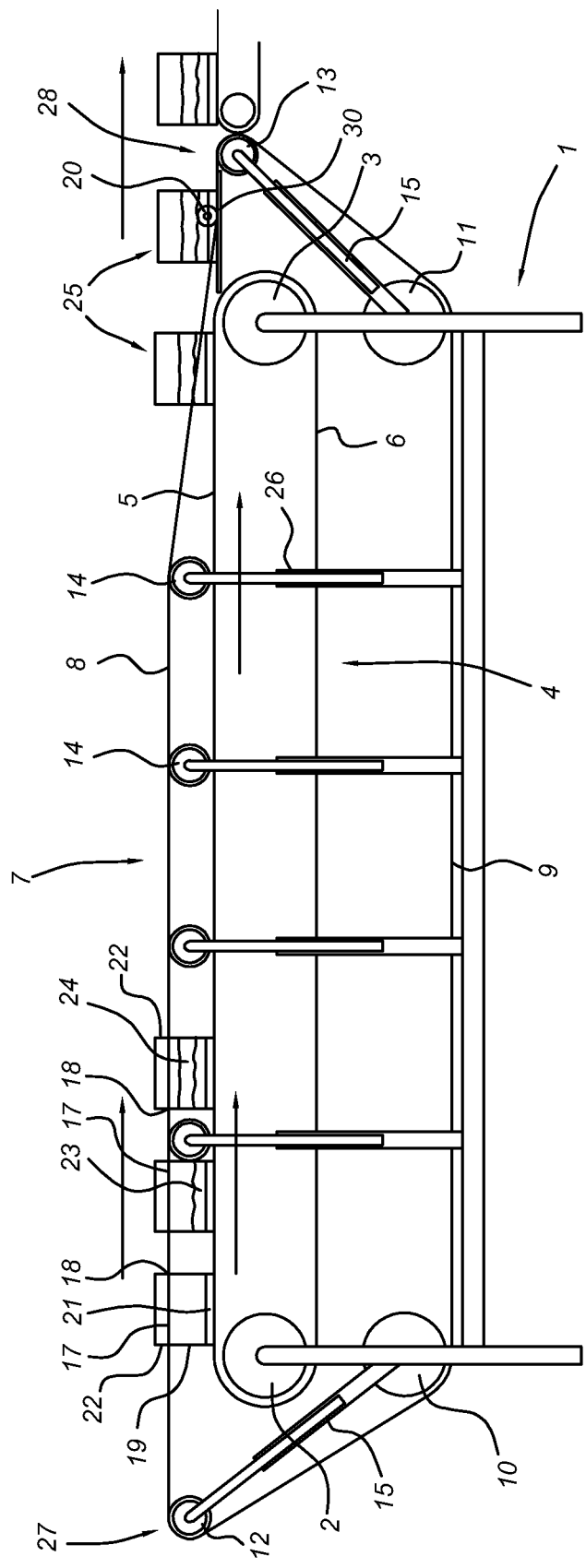

METHOD FOR MANUFACTURING WRAPPED FOOD PRODUCTS, AS WELL AS CONVEYOR SYSTEM FOR CARRYING OUT SAID METHOD

The invention is related to the field of manufacturing food products of various kinds. In particular, food products are envisaged which are wrapped within a circumferentially extending wrapping material and which are accessible from the top. Such wraps can in particularly be used for food products like cakes and biscuits. However, the invention is also related to manufacturing wrapped food products in the form of potato, rice and noodle products. Also, complete meals can be wrapped in this way.

Traditionally, the food products are obtained by manually forming the wrap and subsequently filling said wrap with the food substance. However, such process is cumbersome and time-consuming, which increases the cost price of the wrapped food products thus obtained. Moreover, as a result of the large amount of hand labour, the risks of contamination and lack of hygiene pose a problem.

The object of the invention is therefore to provide a way of manufacturing wrapped food products which can be automated to a large extent so as to increase the efficiency and improve the hygienic circumstances. This object is achieved by means of a method for manufacturing food products, such as mousse products, comprising the steps of:

providing a transport conveyor having a transport surface,
providing a moulding conveyor having moulding apertures therein, said moulding apertures being positioned above the transport surface,
making the transport surface of the transport conveyor and the moulding apertures of the moulding conveyor move in unison from an input end towards an output end,
positioning a mould within a moulding aperture of the moulding conveyor and on top of the transport surface of the transport conveyor near the input end,
applying a food substance within the mould,
removing the products comprising the mould and the food substance from the moulding forms near the output end.

By means of the method according to the invention, it is in the first place possible to provide a mould. To that end, the moulds are positioned within the moulding apertures of the moulding conveyor. Said moulds are supported on the transport surface of the transport conveyor which is positioned directly beneath the moulding conveyor. As a result of the synchronised movement of the transport surface and the moulding apertures, the moulds are transported. This transport movement can bring the moulds to the next station with for instance a dispenser system for applying a bottom within the moulds and on top of the transport surface. Said bottom may for instance comprise a cardboard material, but in other cases it is also possible to use and edible material for the bottom. Other stations may deposit food substances on top of the bottom. These substances may comprise paste like or mousse like products, which are reliably held within the mould.

The process according to the invention may also comprise the step of changing the distance between the moulding apertures in the moulding conveyor and the transport surface of the transport conveyor while moving from the input end towards the output end. Thus, during the transport movement, the moulding conveyor may be made to approach the transport conveyor as a result of which the mould together with the food products contained therein is made to protrude further and further with respect to the moulding conveyor. It is possible to make the moulding conveyor almost completely free, in such a way that the wrapped food products can easily be delivered from said conveyors and onto the next conveyor for further transport and packaging. Thus, a fully automated manufacturing processes for wrapped food products is obtained, even for food products which initially have a paste like or jelly like substance.

The way in which the moulds are obtained may vary. According to a first possibility, simply a strip of suitable material is positioned within the moulding apertures, against the moulding rim thereof. Thereby, the strip of material obtains its desired shape. The material from which the strip is made, may be dependent from the further processing steps to which the wrapped food product has to be subjected. For instance, in case the food product has to be heated, the strip may be a heat resistant cardboard ring. In other cases, a foil material will do. Furthermore, the strip of material may be preformed into a wrap sheet, for instance have the shape and the extent which fits within the mould.

In a particularly preferred embodiment, the method according to the invention comprises the steps of:

depositing a paste like or mousse like edible product within the mould,
making the paste like or mousse like product stiffen and/or adhere to the mould while moving from the input end towards the output end.

The invention is furthermore related to a conveyor system for manufacturing food products, such as mousse products, according to the method described before, comprising a transport conveyor having a transport surface, a moulding conveyor having moulding apertures therein for receiving moulds as well as support means by means of which the moulding conveyor is supported above the transport conveyor, said transport conveyor and moulding conveyor being moveable in unison from an input end towards an output end and wherein the distance between the transport conveyor and the moulding conveyor at the output end is different from the distance between the transport conveyor and the moulding conveyor at the input end.

Said conveyor system may be part of the complete processing line for manufacturing wrapped food products. For instance, the dispenser systems or dosing systems may be associated with the conveyor system according to the invention so as to deposit the desired ingredients within the moulds. Also, robot like apparatus may be provided for depositing the moulds within the mould apertures. Furthermore, a discharge conveyor may be arranged at the output end of the conveyor system so as to transport the wrapped food products towards further processing stations, such as a packaging station.

In a preferred embodiment, the conveyor system according to the invention comprises guiding means which guide the moulding conveyor above the transport surface of the transport conveyor. Said guiding means may be adjustable so as to account for the several products to be manufactured, in particular products of different heights.

Both the transport conveyor and the moulding conveyor preferably of an endless type. In this connection, the transport conveyor may be an endless conveyor comprising an upper transport part and a lower return part. Furthermore, the moulding conveyor may be an endless conveyor comprising an upper part and a lower part, said lower part being positioned beneath the return part of the transport conveyor. Additionally, synchronising means by the provided as well as drive means for the conveyors, said synchronising means synchronising the drive means of each conveyor.

The moulding apertures in the moulding conveyor may be carried out in many several ways. In particular, the moulding conveyor comprises at least one longitudinally extending row of circular apertures. Depending on the size of the apertures, several rows may be arranged next to each other.

Transfer means may be provided at the output end of the transport conveyor, the transfer surface of said transfer means being generally at the same level as the transport surface of the transport conveyor. The moulding conveyor extends over said transfer means so as to deliver the products free at the output end. The transfer surface may be of a low-friction type which allows the products to slide thereon, or may be formed by rollers.

The products can subsequently be taken up by a further conveyor. In this process, it is of importance that the gap between the system and the further conveyor remains as small as possible so as to minimize the risk of damaging the products. This can be achieved by applying a small diameter reverting roller. Alternatively, the reverting means may be carried out as a stationary guide having a small diameter curved reverting part.

The invention is furthermore related to the combination the system as described before, as well as the series of moulds for accommodation within the moulding apertures of the moulding conveyor.

The invention will not be described further with reference to an embodiment of the conveyor system as shown in the drawings.

FIG. 1 shows a side view of the conveyor system.

Figure 2A:
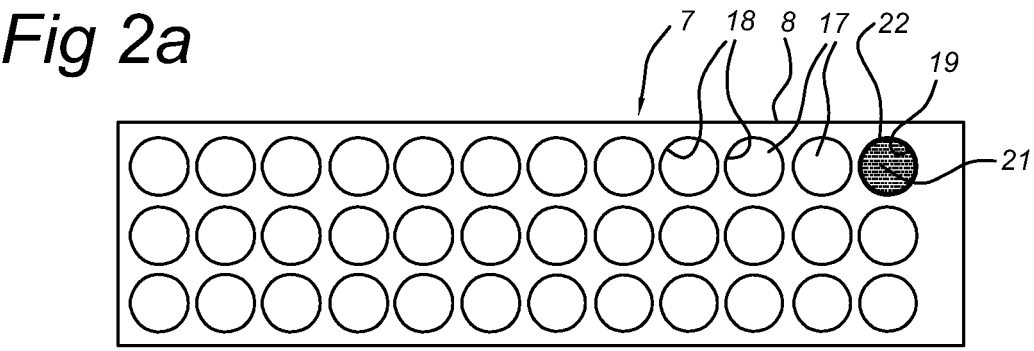
Figure 2B:
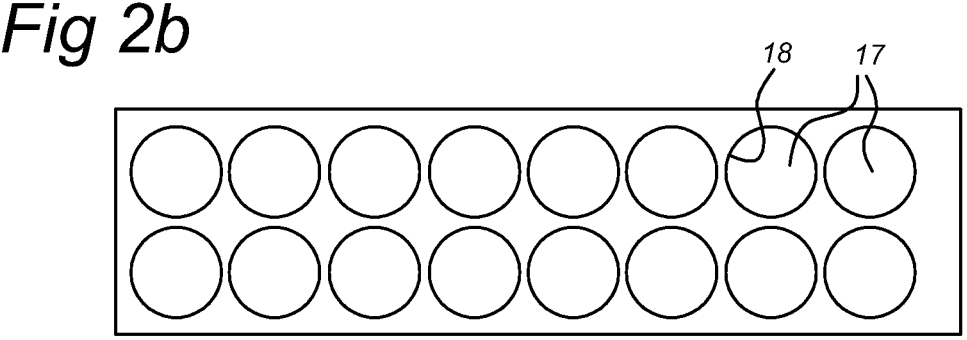
Figure 2C:
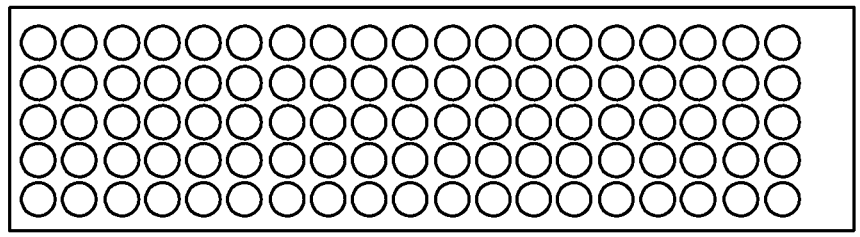

FIGS. 2a-c show several top views of the moulding conveyor.

Figure 3:
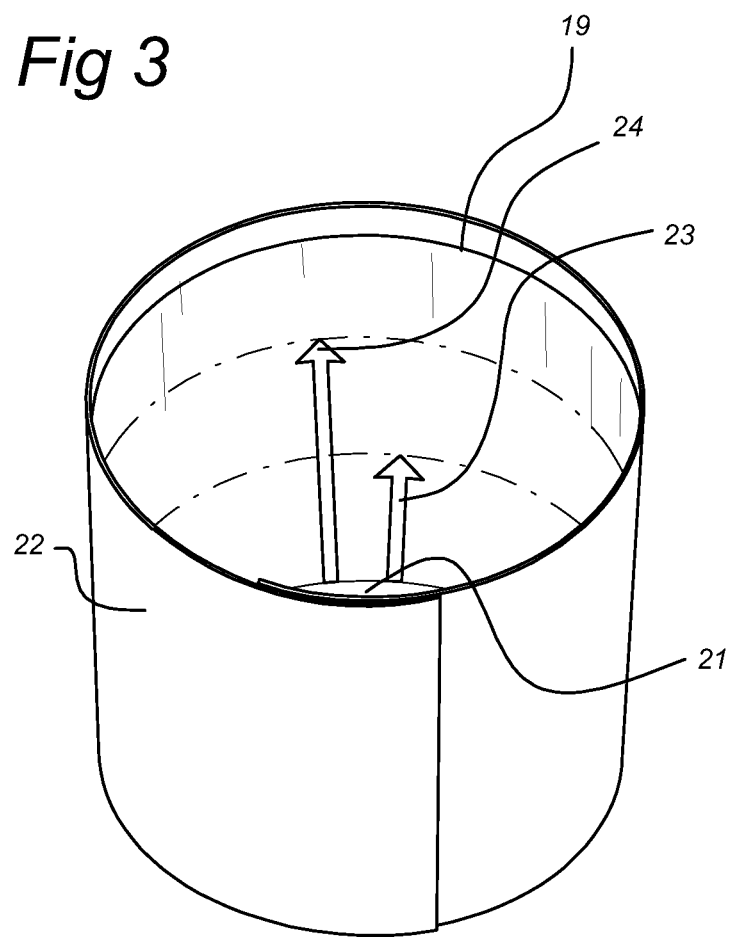

FIG. 3 shows a product comprising a wrapped mould with foil and schematic food layers.

The conveyor system as shown in FIG. 1 comprises an a frame 1, which carries a first pair of return rollers 2, 3, around which the transport conveyor 4 has been applied. Said transport conveyor 4 comprises an upper part or transport surface 5 which is movable in the direction as indicated by the arrow between the input end 27 and the output end 28, as well as a lower or return part 6. At the output end 28, the transport conveyor 4 adjoins a transfer means 30 which may have a low friction surface or a roller surface and the like. The outmost end of said transfer means is delimited by a roller 13 (see below) for reverting a moulding conveyor 7. Alternatively, said outermost end my be carried out as a stationary plate having a bend portion around which the moulding conveyor 7 is guided. In that case, the moulding conveyor shows a sharply curved part which makes it possible to minimize the gap with respect to a following conveyor as much as possible.

Furthermore, the frame 1 carries a set of rollers around which said moulding conveyor 7 has been applied. The moulding conveyor 7 comprises an upper part 8 which is movable in the direction as shown by the arrow, as well as a lower part of return part 9. The set of rollers around which the moulding conveyor 7 has been guided, first of all comprises the bottom rollers 10 and 11, as well as the extreme rollers 12 and 13. Said extreme rollers 12 and 13 are connected to the adjustment devices 15 and 16, such as pneumatically or hydraulically piston/cylinder devices.

The upper part 8 of the moulding conveyor 4 is furthermore kept at the distance above the transport surface 5 of the transport conveyor 4 by means of a number of adjustment rollers 14, the position of which in the height direction can be adjusted by means of the piston/cylinder devices 26. It is important to note that the distance between the upper part 8 of the moulding conveyor 4 and the transport surface 5 of the transport conveyor 4 can be adjusted by means of the piston/cylinder devices 26, for instance dependent on the height and other sizes of the wrapped food products 25 to be manufactured.

Furthermore, one or more top rollers 20 have been provided, which are on top of the upper part 8 of the moulding conveyor 7. Said top rollers 20 press the conveyor belt upper part 8 onto the transfer means 30.

Now turning to the FIGS. 2a-c, it is shown that the moulding conveyor 7 comprises rows of moulding apertures 17, which may be are different sizes. Said moulding apertures 17 each define a moulding rim 18. The number of moulding apertures 17 depends on the size of the apertures themselves. Within each moulding aperture 17 and against the moulding rim 18, mould 22 may be applied. Said mould 22 takes the form of the moulding rim 18, thereby defining the shape of the mould 22. In the embodiment shown, a bottom 21 has been placed in the mould 12 on the transport surface 5 of the transport conveyor 4.

In the side view of FIG. 1, a number of these moulds 22 has been shown. Furthermore, it is shown that, starting from the left in FIG. 1, first of all the mould 22 and the bottom 21 are applied. A decorative sheet or foil 19 is positioned in the mould 22. Subsequently, further food substances 23 and 24 are applied on top of the bottom 21 and against the internal surface of the wrap sheet 19. The products 25 thus obtained are transported by means of the transport conveyor 4 and the moulding conveyor 5 which move in unison and in the same direction between the input end 27 and the output end 28 of the conveyor system.

As shown in the side view of FIG. 1, the major portion of the upper part 8 of the moulding conveyor 5 is at a constant distance above the transport surface 5 of the transport conveyor 4. In this way, the mould 22 can be applied and also the food substances can be deposited within the mould. During the travel from the input and 27 to the output end 28, the products 25 have sufficient time to obtain the required shape, and the food substances, such as mousse or jelly, are able to adhere to the sheet 19. Near the output end 28, the trajectory starts to show a diminishing distance between the upper part 8 of the moulding conveyor 7 and the transport surface 5 of the transport conveyor 4. As a result of this diminishing distance, which is reduced to zero by the top rollers 20, the products 25 are made to project further and further above the upper part 8 of the moulding conveyor 7. Near the output end 28, the upper part 8 of the moulding conveyor 7 is furthermore pressed onto the transport surface 5 of the transport conveyor 4 through the influence of the pressing roller 20. The distance between the upper part and the top or transfer means 30 is ultimately reduced to zero by the top rollers 20, as a result of which the products 25 are freed from the moulding conveyor 7 and can now be transferred to next station, or to the next conveyor (not shown).

The products 25 obtained has been shown schematically in FIG. 3. Said products comprises mould 22, the sheet 19 and the food layers 23, 24 which have been indicated schematically. Also a bottom 21 has been applied.

The moulding conveyor 7 is easily replaceable by retracting the piston/cylinder device. The top rollers 20 touch the upper side of the upper part 8 of the moulding conveyor 7 outside the area thereof which comprises the moulding apertures 17.

LIST OF REFERENCE SIGNS

1. Frame
2., 3. Roller transport conveyor
4. Transport conveyor
5. Transport surface of transport conveyor
6. Return part of transport conveyor
7. Moulding conveyor 8. Upper part of moulding conveyor
9. Lower part or return part of moulding conveyor
10.-14. Roller of moulding conveyor
15. Piston/cylinder device
17. Moulding aperture of moulding conveyor
18. Moulding rim of moulding aperture
19. Wrap sheet
20. Top roller
21. Bottom
22. Mould
23., 24. Food substance
25. Wrapped food product
26. Piston/cylinder device
27. Input end
28. Output end
30. Transfer means

The invention claimed is:

1. A combination of a conveyor system and a series of molds for manufacturing paste, mousse, or jelly food products (25), comprising:
   an endless transport conveyor (4) comprising an upper transport part (5) and a lower return part (6);
   an endless moulding conveyor (7) comprising an upper part (8) and a lower part (9), said upper part (8) of the moulding conveyor (7) having moulding apertures (17) therein for receiving moulds (22), and said lower part (9) of the moulding conveyor (7) being positioned beneath the return part (6) of the transport conveyor (4);
   a support means (14, 26) by which the moulding conveyor (7) is supported directly above the upper transport part (5) of the transport conveyor (4), said transport conveyor (4) and said moulding conveyor (7) being moveable in unison from an input end (27) towards an output end (28), and wherein the distance between the transport conveyor (4) and the moulding conveyor (7) at the output end (28) is smaller than the distance between the transport conveyor (4) and the moulding conveyor (7) at the input end (27); and
   a series of moulds (22) each accommodated within respective moulding apertures (17) of the moulding conveyor (7) in such a way that during transport movement the moulds (22) are made to protrude further and further above the moulding conveyor while being supported on the upper transport part (5) of the transport conveyor (4).

2. The combination according to claim 1, wherein said lower part (9) being positioned beneath the return part (6) of the transport conveyor (4).

3. The combination according to claim 1, wherein synchronising means are provided as well as drive means for the conveyors, said synchronising means synchronising the drive means of each conveyor.

4. The combination according to claim 1, wherein the moulding conveyor (7) comprises at least one longitudinally extending row of circular apertures (17).

5. The combination according to claim 1, wherein transfer means (30) are provided at the output end of the transport conveyor, the transfer surface of said transfer means (30) being generally at the same level as the transport surface (5) of the transport conveyor (4), and the moulding conveyor (7) extending over said transfer means, possibly under the influence of at least a top roller (20) positioned above the moulding conveyor (7).

6. The combination according to claim 5, wherein reverting means are provided at the end of the transfer surface pointing away from the transport conveyor (5), and the moulding conveyor being guided over said reverting means.

* * * * *